(12) United States Patent
Cohrt

(10) Patent No.: US 10,613,729 B2
(45) Date of Patent: Apr. 7, 2020

(54) BUILDING AND SECURITY MANAGEMENT SYSTEM WITH AUGMENTED REALITY INTERFACE

(71) Applicant: Johnson Controls Technology Company, Plymouth, MI (US)

(72) Inventor: Henning Cohrt, Simi Valley, CA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 112 days.

(21) Appl. No.: 15/583,815

(22) Filed: May 1, 2017

(65) Prior Publication Data

US 2017/0322715 A1    Nov. 9, 2017

Related U.S. Application Data

(60) Provisional application No. 62/331,413, filed on May 3, 2016.

(51) Int. Cl.
  *G06F 3/0484* (2013.01)
  *G06F 3/0481* (2013.01)

(52) U.S. Cl.
  CPC ...... *G06F 3/04847* (2013.01); *G06F 3/04817* (2013.01)

(58) Field of Classification Search
  None
  See application file for complete search history.

(56) References Cited

U.S. PATENT DOCUMENTS

| | | | | |
|---|---|---|---|---|
| 9,838,844 B2* | 12/2017 | Emeis | .................... | G06T 19/006 |
| 2007/0273610 A1* | 11/2007 | Baillot | ................. | G02B 27/017 |
| | | | | 345/8 |
| 2011/0157357 A1* | 6/2011 | Weisensale | ............ | H04N 7/173 |
| | | | | 348/143 |
| 2013/0038707 A1* | 2/2013 | Cunningham | ......... | H04N 7/183 |
| | | | | 348/65 |
| 2013/0170710 A1* | 7/2013 | Kuoch | ............... | G06K 9/00624 |
| | | | | 382/104 |
| 2014/0152651 A1 | 6/2014 | Chen et al. | | |
| 2014/0258052 A1* | 9/2014 | Khuti | ................... | G06Q 10/087 |
| | | | | 705/28 |
| 2015/0202962 A1* | 7/2015 | Habashima | ............ | B60K 35/00 |
| | | | | 345/633 |
| 2015/0235267 A1* | 8/2015 | Steube | ............... | G06Q 30/0261 |
| | | | | 705/14.58 |
| 2016/0035246 A1* | 2/2016 | Curtis | ..................... | H04L 67/10 |
| | | | | 434/219 |

(Continued)

*Primary Examiner* — Howard Cortes
(74) *Attorney, Agent, or Firm* — Foley & Lardner LLP

(57) ABSTRACT

A building management system includes a first device of building equipment, a camera, and a user interface system. The camera collects a first camera feed displaying an image of the first device of building equipment. The user interface system is configured to receive the camera feed displaying the image of the first device. The user interface system is also configured to generate an augmented user interface by overlaying onto the camera feed a first selectable option associated with a first command to be performed on the first device. The user interface system is also configured to perform the first command on the first device in response to a user selecting the first selectable option via the augmented user interface.

20 Claims, 15 Drawing Sheets

(56) References Cited

U.S. PATENT DOCUMENTS

| | | | |
|---|---|---|---|
| 2016/0090839 A1* | 3/2016 | Stolarczyk | E21C 35/24 |
| | | | 299/1.4 |
| 2016/0127712 A1* | 5/2016 | Alfredsson | H04N 21/4223 |
| | | | 348/14.07 |
| 2016/0173816 A1* | 6/2016 | Huenerfauth | G06Q 10/20 |
| | | | 348/14.02 |
| 2016/0267759 A1* | 9/2016 | Kerzner | G08B 13/19645 |
| 2016/0313902 A1* | 10/2016 | Hill | G06F 3/04847 |
| 2017/0294132 A1* | 10/2017 | Colmenares | G06T 7/75 |

* cited by examiner

BUILDING AND SECURITY MANAGEMENT SYSTEM WITH AUGMENTED REALITY INTERFACE

CROSS-REFERENCE TO RELATED PATENT APPLICATION

This application claims the benefit of and priority to U.S. Provisional Patent Application No. 62/331,413 filed May 3, 2016, the entire disclosure of which is incorporated by reference herein.

BACKGROUND

The present disclosure relates generally to a building and security management system with an augmented reality interface and more particularly to a building and security management system with an interactive augmented reality user interface that overlays security management system information on a video feed.

A building may have a security management system controlled by an operator. The operator may have access to a large number of video feeds and large number of alarms, event reports, and controls that are part of the security management system. Currently, the operator is required to independently associate information from the alarms, event reports, and controls with the video feeds.

SUMMARY

In one embodiment, a building management system includes a first device of building equipment, a camera, and a user interface system. The camera collects a first camera feed displaying an image of the first device of building equipment. The user interface system is configured to receive the camera feed displaying the image of the first device. The user interface system is also configured to generate an augmented user interface by overlaying onto the camera feed a first selectable option associated with a first command to be performed on the first device. The user interface system is also configured to perform the first command on the first device in response to a user selecting the first selectable option via the augmented user interface.

In another embodiment, a method for providing a building management system to an operator includes receiving a camera feed from a camera of a video management system. The method also includes detecting a first device of building equipment in the camera feed. The method further includes requesting, in response to detecting the first device in the camera feed, information about the first device from the building management system. The method also includes receiving, in response to requesting the information about the first device from the building management system, the information about the first device from the building management system. The method further includes overlaying, in response to receiving the information about the first device, the information about the first device on the camera feed, forming an augmented user interface.

In another embodiment, a user interface system includes a video management system, a building management system, a security management system, a processing circuit, and a display device. The video management system receives a camera feed from one of a plurality of cameras positioned within a building. The building management system includes a plurality of components associated within the building. The security management system stores a plurality of commands associated with at least one of the plurality of components. The processing circuit receives the camera feed from the video management system and that is communicable with the building management system and the security management system. The display device receives an augmented user interface from the processing circuit, the augmented user interface created by overlaying the camera feed with at least one of i) information related to at least one of the components; and ii) at least one of the commands.

DETAILED DESCRIPTION

Overview

Figure 1A:
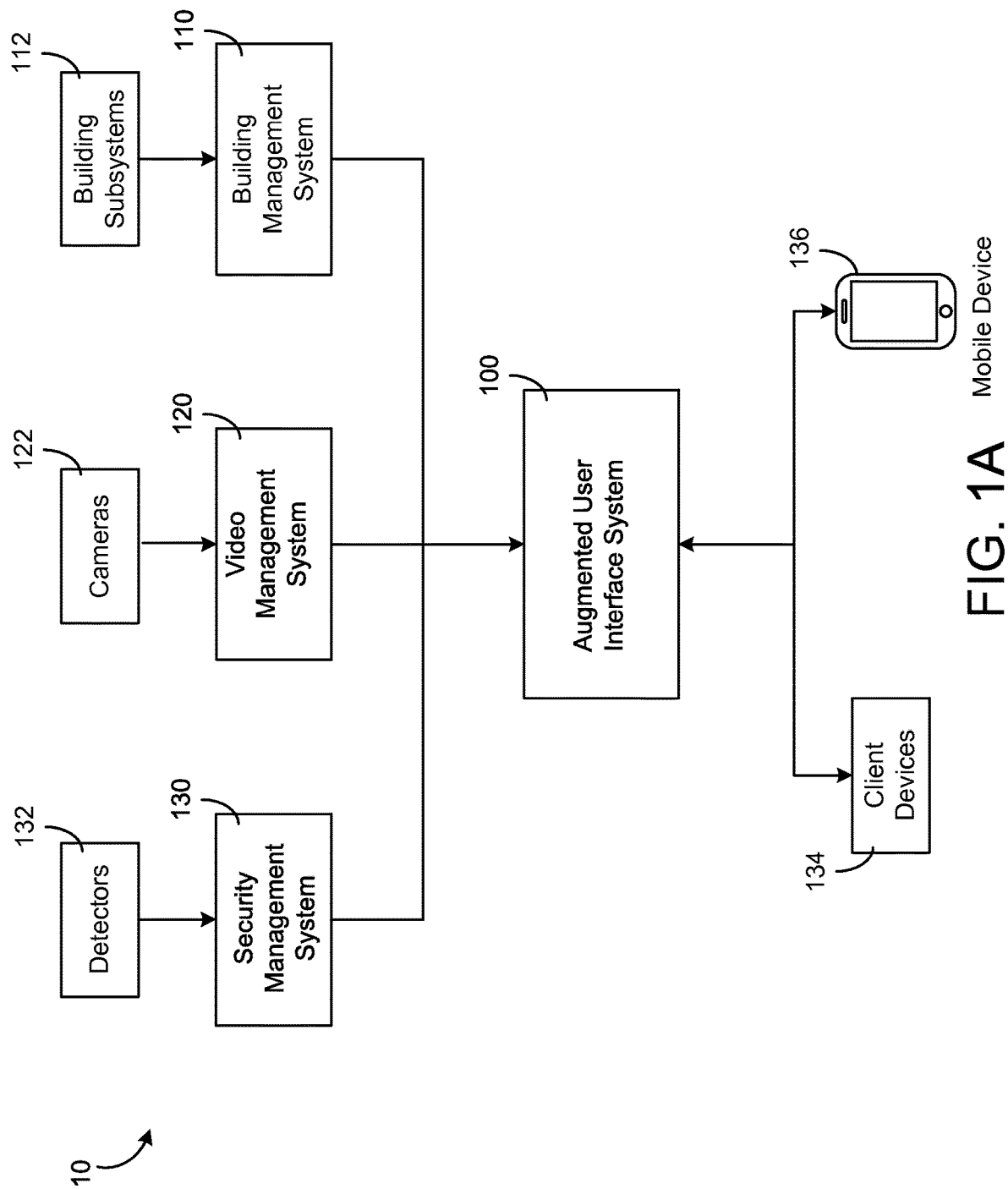
FIG. 1A is a block diagram of an augmented user interface system, according to an exemplary embodiment.

Buildings typically include a building management system, a video management system, and a security management system. In some instances it is necessary to correlate information from one of these systems to another. For example, when viewing a camera feed it may be desirable to interact with a specific object in the camera feed using the security management system. Such an interaction would require a correlation between the camera feed and the security management system. Conventionally, these systems operate independently and require an operator to mentally correlate information from one system to another. Accordingly, the operator is required to acquire a familiarity with the systems of a particular building (e.g., know the name of specific doors in the security management system, etc.). Mental correlation requires an increased reaction time to live events; this can be detrimental when events are time sensitive such as is the case in break-ins and evacuations. The operator may also have reduced situational awareness of the operation because of mental correlation, potentially allowing the operator to fail to see important events or alerts. In general, mental correlation results in an increased risk of mistakes made by the operator (e.g., opening the wrong door). For example, the operator may not know which door to command or the operator may accidentally select an adjacent entry in a list. Furthermore, conventional systems do not provide information regarding the position of objects with respect to the camera feeds from the video management system.

In many applications it is desirable to implemented a building and security management system that collects information from various systems and combine the information in a single, easy to use platform. A building and security management system may include an augmented user interface system that can be used to overlay information from a building management system and security management system on a camera feed from a video management system. The building and security management system may allow intuitive visualization of status, history, and alarms related to a target component in a building. Additionally, the building and security management system may facilitate control of the target component while monitoring the status of the component. The building and security management system may allow immediate association of items from the security management system with objects from the camera feed. building and security management system may be advantageous over conventional systems on small screens because information is condensed into a single platform. By providing a simple, intuitive platform the building management and security system may reduce a learning curve for operators compared to individually learning the building management system, the security management system, and the video management system and developing mental correlations. Because information from these systems is condensed on a single platform, the reaction time of the operator to live events may be decreased, mistakes, in general, may be decreased, and the operator may have an increased situational awareness. Finally, the building management and security system may more readily be utilized by the operator on a device having a small display, such as a smart phone or tablet, because the building management and security system is a single platform that does not require the operator to switch between screens. However, the building management and security system may be used on other devices such as computers or televisions.

Augmented User Interface System

According to various embodiments, a system, shown as a control system 10, for a building (e.g., plant, office, etc.) includes an interface, shown as augmented user interface system 100, a first system, shown as building management system 110, a second system, shown as video management system 120, and a third system, shown as security management system 130. As shown in FIG. 1A, augmented user interface system 100 is configured to selectively receive and combine information from building management system 110, video management system 120, and security management system 130.

Building management system 110 includes systems, shown as building subsystems 112, that includes a database of all building management system components (e.g., gates, doors, keypads, card readers, HID readers, access points, bollards, elevators, cabinets, areas, etc.). Building subsystems 112 may include information such as the status (e.g., secure, alarm, fault, active, inactive, etc.), identifier (e.g., name, serial number, etc.), and location (e.g., floor, room, etc.) of the components. Video management system 120 may contain various camera feeds (e.g., live video, stored video, partially stored video, still images, etc.) from cameras, shown as cameras 122, from various locations in the building. For example, a building may have several cameras 122 on each floor. Video management system 120 may receive camera feeds from each camera 122 and associate a location, time, and direction with each of the camera feeds. According to various embodiments video management system 120 includes fixed cameras 122. However, in some embodiments, video management system 120 additionally or alternatively includes pan-tilt-zoom (PTZ) cameras 122. Security management system 130 may include a listing of various alerts (e.g., open, closed, access granted, access denied, forced entry, etc.) corresponding to detectors, shown as detectors 132, in the building. Detectors 132 may be, for example, gates, doors, keypads, card readers, HID readers, access points, bollards, elevators, cabinets, areas, and other similar components in the building. For example, security management system 130 may indicate that an individual attempted to access a particular detector 132 but that access was denied. Security management system 130 may store alerts for display at a later time. Security management system 130 may also generate and display event reports for a target area in the building or for a target detector 132 or component.

According to various embodiments, augmented user interface system 100 is capable of selectively overlaying information from building management system 110 and security management system 130 on a particular camera feed from video management system 120. Accordingly, augmented user interface system 100 facilitates visualization of information from building management system 110, video management system 120, and security management system 130 at a central location. Therefore, augmented user interface system 100 may simplify the process for an operator to handle and interact with various complex systems.

Information from building management system 110 and security management system 130 that is displayed in augmented user interface system 100 is termed augmented content. The augmented content is provided to a device, shown as a mobile device 136, and/or additional devices, shown as client devices 134. Mobile device 136 and client devices 134 may be, for example, a screen, a monitor, a tablet, a phone (e.g., smart phone, personal electronic device, etc.), a television, a display, a computer, and other similar devices. When using augmented user interface system 100, an operator may, on mobile device 136 and/or client devices 134, selectively hide or display augmented content. The augmented content of augmented user interface system 100 may be dynamically updated to reflect real-time conditions. For example, when the status of a component in augmented user interface system 100 is changed, the status, and other options and commands associated with the component, may be dynamically updated. According to some embodiments, only augmented content that pertains to the particular camera feed of a single camera 122 displayed may be visualized by the operator. Augmented user interface system 100 may be operable between an "augmented" mode and a "normal" mode. In the augmented mode, augmented content may be displayed to the operator on augmented user interface system 100. However, in the normal mode only the camera feed from video management system 120 may be displayed to the operator on augmented user interface system 100. According to one embodiment, augmented user interface system 100 is presented on a single screen and does not require the operator to switch between screens.

Figure 1B:
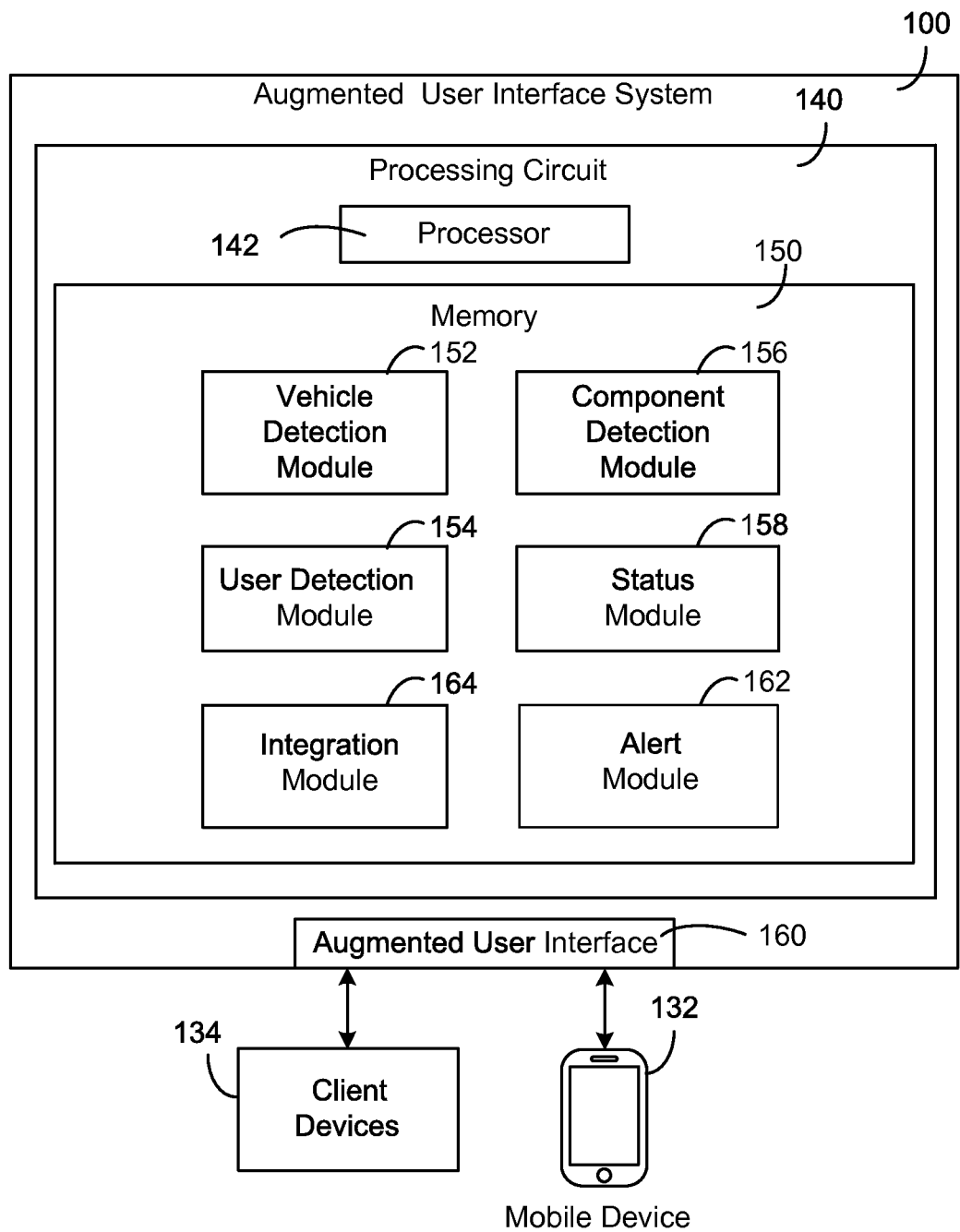
FIG. 1B is a block diagram of an augmented user interface system including a processor, a memory, and an augmented user interface, according to an exemplary embodiment.

FIG. 1B illustrates augmented user interface system 100 including a circuit, shown as processing circuit 140. Processing circuit 140 includes a processor, shown as processor 142, a memory, shown as memory 150, and an interface, shown as augmented user interface 160. According to various embodiments, augmented user interface system 100 is configured to provide augmented user interface 160 to an operator (e.g., through mobile device 136 and/or client devices 134, etc.). Processing circuit 140 is configured to perform commands according to instructions stored on memory 150 and according to augmented user interface 160. Further, in some embodiments, processing circuit 140 is configured to store information on memory 150.

Augmented user interface system 100 may be implemented by a computer, a laptop, a tablet, a phone, a display device, or any other computing device. Processing circuit 140 may be a number of processors. For example, processing circuit 140 may be a number of processors in series or in parallel. Memory 150 may be any suitable memory storage device such as a hard drive, a flash drive, flash memory, random access memory (RAM), or other suitable memory storage device.

According to various embodiments, memory 150 includes various modules (e.g., circuits, etc.) that are individually configured to perform specific tasks that facilitate utilization of augmented user interface 160 as described herein. In an exemplary embodiment, memory 150 includes a first module, shown as vehicle detection module 152, a second module, shown as user detection module 154, a third module, shown as component detection module 156, a fourth module, shown as status module 158, a fifth module, shown as alert module 162, and a sixth module, shown as integration module 164.

Vehicle detection module 152 may function to detect various vehicles. For example, vehicle detection module 152 may analyze camera feeds from cameras 122 to determine if a vehicle is present in any of the camera feeds. To make this determination, vehicle detection module 152 may perform various image analyses including, but not limited to, edge detection, shape detection, movement detection, and other similar analyses. If a vehicle is present in a camera feed from cameras 122, vehicle detection module 152 may trace (e.g., outline, etc.) the vehicle with a border displayed on a camera feed transmitted to augmented user interface 160. In this way, vehicle detection module 152 may alter (e.g., change, etc.) the camera feed before it is transmitted to augmented user interface 160.

Additionally, vehicle detection module 152 may determine a location of the vehicle in the camera feeds from cameras 122. For example, based on which camera 122 is providing a camera feed that shows the vehicle, vehicle detection module 152 may determine a location of the vehicle by correlating the camera with a location of camera 122 stored within a database. Vehicle detection module 152 may display this location on the camera feed transmitted to augmented user interface 160. For example, vehicle detection module 152 display the name of an entrance that the vehicle is approaching (e.g., "FRONT ENTRANCE," "REAR ENTRANCE," "SHIPPING ENTRANCE," etc.) on the camera feed transmitted to augmented user interface 160. In other applications, vehicle detection module 152 may display a floor plan of a building, with a location of the vehicle highlighted on the floor plan, on the camera feed transmitted to augmented user interface 160.

Further, vehicle detection module 152 may facilitate user interaction with a vehicle shown in the camera feed transmitted to augmented user interface 160. For example, if a user selects the vehicle displayed by augmented user interface 160 (e.g., by clicking on the vehicle, etc.), vehicle detection module 152 may provide the user with additional information about the vehicle (e.g., authorization level, payload, etc.). In this way, vehicle detection module 152 can be utilized by a user to selectively provide the user with more information via augmented user interface 160 in response to user commands.

User detection module 154 may function to detect various users. For example, user detection module 154 may analyze camera feeds from cameras 122 to determine if a user is present in any of the camera feeds. To make this determination, user detection module 154 may perform various image analyses including, but not limited to, edge detection, shape detection, movement detection, facial recognition, iris recognition, biometric analysis (e.g., gait analysis, etc.), and other similar analyses. If a user is present in a camera feed from cameras 122, user detection module 154 may trace (e.g., outline, etc.) the user with a border displayed on a camera feed transmitted to augmented user interface 160. In this way, user detection module 154 may alter (e.g., change, etc.) the camera feed before it is transmitted to augmented user interface 160.

Additionally, user detection module 154 may determine a location of the user in the camera feeds from cameras 122. For example, based on which camera 122 is providing a camera feed that shows the user, user detection module 154 may determine a location of the user by correlating the camera with a location of camera 122 stored within a database. User detection module 154 may display this location on the camera feed transmitted to augmented user interface 160. For example, user detection module 154 display the name (e.g., alphanumeric string of characters associated with a component, vehicle, and/or user, etc.) of a room that the user is in (e.g., "EQUIPMENT ROOM," "MAIN LOBBY," "CONTROL ROOM," etc.) on the camera feed transmitted to augmented user interface 160. In other applications, user detection module 154 may display a floor plan of a building, with a location of the user highlighted on the floor plan, on the camera feed transmitted to augmented user interface 160.

Further, user detection module 154 may facilitate user interaction with a user shown in the camera feed transmitted to augmented user interface 160. For example, if a user selects the user displayed by augmented user interface 160 (e.g., by clicking on the user, etc.), user detection module 154 may provide the user with additional information about the user (e.g., authorization level, name, position, contact information, etc.). In this way, user detection module 154 can be utilized by a user to selectively provide the user with more information via augmented user interface 160 in response to user commands.

Component detection module 156 may function to determine which components are proximate to (e.g., near, adjacent, etc.) a vehicle, as determined by vehicle detection module 152, and/or a user, as determined by user detection module 154. For example, component detection module 156 may analyze camera feeds from cameras 122 to determine if a user is present in any of the camera feeds. To make this determination, component detection module 156 may perform various image analyses including, but not limited to, edge detection, shape detection, movement detection, facial recognition, and other similar analyses. If a component is present in a camera feed from cameras 122, component detection module 156 may trace (e.g., outline, etc.) the component with a border displayed on a camera feed transmitted to augmented user interface 160. In this way, component detection module 156 may alter (e.g., change, etc.) the camera feed before it is transmitted to augmented user interface 160.

Additionally, component detection module 156 may determine a location of the component in the camera feeds from cameras 122. For example, based on which camera 122 is providing a camera feed that shows the component, component detection module 156 may determine a location of the component by correlating the camera with a location of camera 122 stored within a database. Component detection module 156 may display this location on the camera feed transmitted to augmented user interface 160. For example, component detection module 156 display the name (e.g., alphanumeric string of characters associated with a component, vehicle, and/or user, etc.) of a component in a room that a user is in (e.g., "CONTROL PANEL," "BOLLARD," "DOOR 11," etc.) on the camera feed transmitted to augmented user interface 160. In other applications, component detection module 156 may display a floor plan of a building, with a location of the component highlighted on the floor plan, on the camera feed transmitted to augmented user interface 160.

Further, component detection module 156 may facilitate user interaction with a component shown in the camera feed transmitted to augmented user interface 160. For example, if a user selects the component displayed by augmented user interface 160 (e.g., by clicking on the user, etc.), component detection module 156 may provide the user with additional information about the component (e.g., last date of service, configuration information, etc.). In this way, component detection module 156 can be utilized by a user to selectively provide the user with more information via augmented user interface 160 in response to user commands.

Status module 158 may function to determine and/or display a status (e.g., operational status, authorization status, etc.) of various components, vehicles, and/or users present in a camera feed from cameras 122. For example, status module 158 may determine an operational state of a component in a camera feed from cameras 122 that is transmitted to augmented user interface 160. Status module 158 may display a status indicator, such as an icon or an alphanumeric string of characters, on the camera feed transmitted to augmented user interface 160. Status module 158 may display any number of statuses in, for example, a description object. The status indicator that is displayed by status module 158 may be selected based on the status of the component, vehicle, and/or user in the camera feed. For example, if a component is operational, the status indicator selected by status module 158 may be a green box. Status module 158 may display the status indicator proximate to the component, vehicle, and/or user. For example, status module 158 may cause a status indicator to be displayed proximate to a border, as displayed and constructed by component detection module 156, surrounding a component.

Further, status module 158 may facilitate user interaction with a status displayed in the camera feed transmitted to augmented user interface 160. For example, if a user selects the status displayed by augmented user interface 160 (e.g., by clicking on a status indicator, etc.), status module 158 may provide the user with additional information about the status (e.g., specific information about a malfunction, etc.) or allow the user to toggle the status displayed by status module 158 (e.g., from malfunctioning to functioning, etc.). In this way, status module 158 can be utilized by a user to selectively provide the user with more information via augmented user interface 160 in response to user commands.

Alert module 162 may function to determine and/or display an alert (e.g., malfunction indication, unauthorized access indication, etc.) of various components, vehicles, and/or users present in a camera feed from cameras 122. For example, alert module 162 may cause text (e.g., alphanumeric strings, etc.) to be displayed on the camera feed transmitted to augmented user interface 160.

Further, alert module 162 may facilitate user interaction with an alert displayed in the camera feed transmitted to augmented user interface 160. For example, if a user selects the alert displayed by augmented user interface 160 (e.g., by clicking on an alert, etc.), alert module 162 may provide the user with additional information about the alert (e.g., specific information about an instance of unauthorized access by a user, etc.) or allow the user to toggle the alert displayed by alert module 162 (e.g., to silence the alarm, etc.). In this way, alert module 162 can be utilized by a user to selectively provide the user with more information via augmented user interface 160 in response to user commands.

Integration module 164 may function to selectively integrate information from building management system 110, video management system 120, and security management system 130. Further, integration module 164 may facilitate the overlaying of information from vehicle detection module 152, user detection module 154, component detection module 156, status module 158, and alert module 162 on augmented user interface 160. Further, integration module 164 may alter augmented user interface 160 in response to inputs received from a user via augmented user interface 160.

Figure 2:
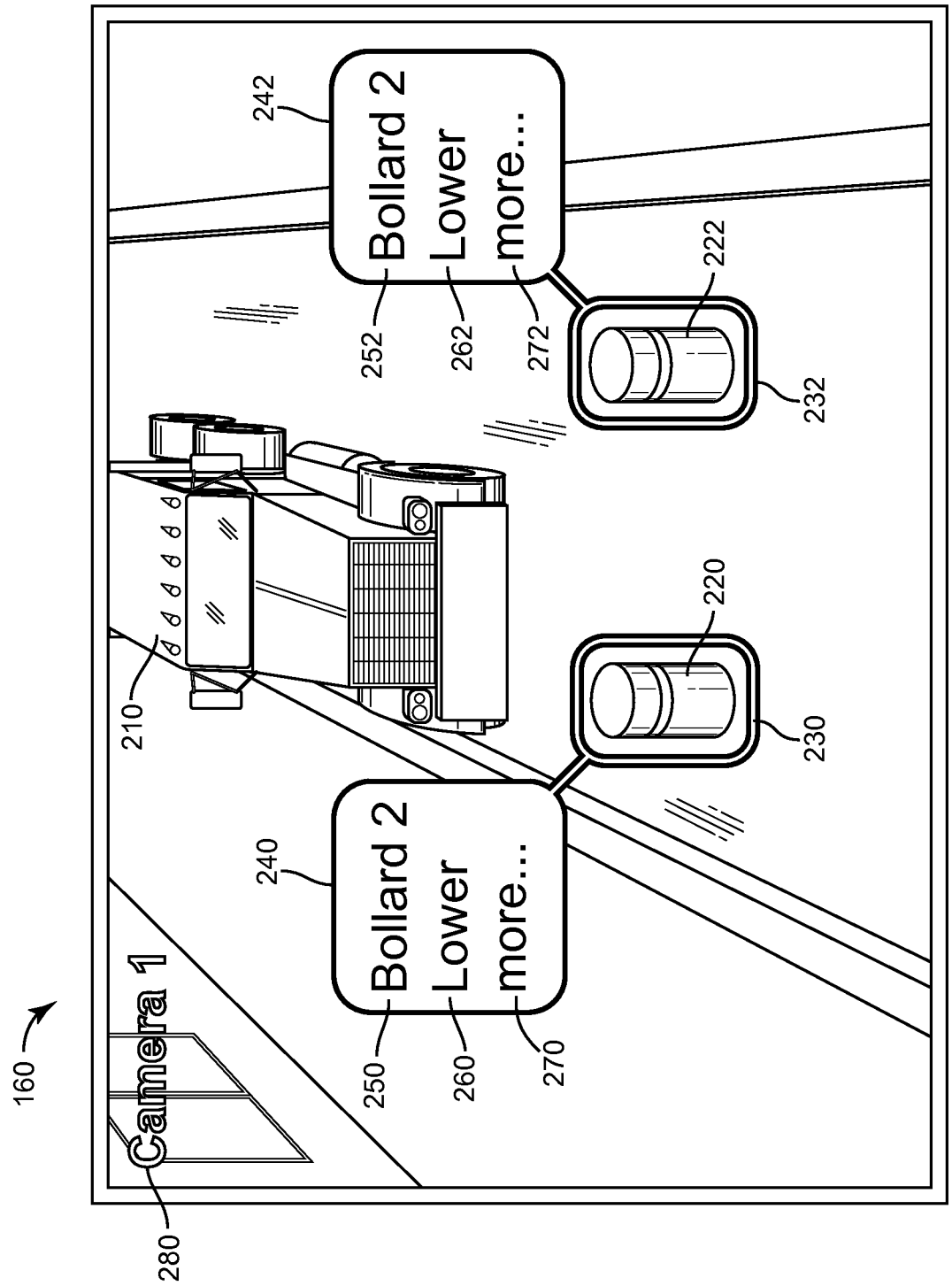
FIG. 2 is a view of an augmented user interface system, according to an exemplary embodiment.

FIGS. 2-9 illustrate an exemplary operation using augmented user interface 160. As shown in FIG. 2, augmented user interface 160 is viewing a vehicle (e.g., truck, car, semi, etc.), shown as vehicle 210, approaching a first components (e.g., barrier, gate, barricade, crash bar, glass break sensor, emergency button, etc.), shown as bollard 220, and a second components (e.g., barrier, gate, barricade, crash bar, glass break sensor, emergency button, etc.), shown as bollard 222. According to an exemplary embodiment, vehicle 210 wishes to travel beyond bollard 220 and bollard 222. Following this embodiment, a driver of vehicle 210 may communicate with the operator of augmented user interface 160. The operator may then utilize augmented user interface 160 to confirm the driver's request. Once confirmed, the operator may decide to interact with any of bollard 220 and bollard 222.

As shown in FIG. 2, bollard 220 and bollard 222 are recognized by augmented user interface 160. According to various embodiments, augmented user interface 160 overlays augmented information including a first border, shown as border 230, around bollard 220 and a second border, shown as border 232, around bollard 222. Border 230 and border 232 may facilitate object identification and/or selection by the operator. As shown in FIG. 2, border 230 generally borders bollard 220 and border 232 generally borders bollard 222. According to an exemplary embodiment, the augmented information further includes a first window, shown as selection pane 240, is coupled to border 230 and a second window, shown as selection pane 242, is coupled to border 232. Selection pane 240 may include a first text box, shown as label 250, a second text box, shown as first option 260, and a third text box, shown as expandable list 270. Selection pane 242 may include a first text box, shown as label 252, a second text box, shown as first option 262, and a third text box, shown as expandable list 272. According to various embodiments, selection pane 240 and selection pane 242 additionally include various information about bollard 220 and bollard 222, respectively, such as item name, authorized operator actions, status information (e.g., secure, alarm, fault, active, inactive, etc.), history information, and alarm information.

According to one embodiment, first option 260 and expandable list 270 allow the operator to interact with bollard 220 while first option 262 and expandable list 272 allow the operator to interact with bollard 222. According to various embodiments, first option 260, first option 262, expandable list 270, and expandable list 272 are selectable. However, label 250 and label 252 may also be selectable. Selection of any of label 250, first option 260, and expandable list 270 may cause physical changes to bollard 220. Similarly, selection of any of label 252, first option 262, and expandable list 272 may cause physical changes to bollard 222. For example, selection of first option 260 may lower bollard 220 such that vehicle 210 may traverse bollard 220. Additionally, selection of expandable list 270 or expandable list 272 may present additional text boxes to the operator. For example, selection of expandable list 272 may present the operator with the option to raise or illuminate bollard 222. In some embodiments, expandable list 270 and expandable list 272 are eliminated because either no additional text boxes exist or because the additional text boxes are incorporated into selection pane 240 and selection pane 242, respectively.

The operator may make selections through augmented user interface 160 via an input device. The input device may be, for example, a mouse, a stylus, keyboard, a microphone (e.g., voice recognition), a camera (e.g., gaze recognition, gesture recognition), a screen (e.g., touch screen, etc.), a tactile input, and other suitable input devices such that augmented user interface 160 may be tailored for a target application. Augmented user interface 160 may be configured to group nearby structures, objects, and devices so that they may be controlled simultaneously. For example, bollard 220 and bollard 222 may be grouped together such that when the operator makes a selection of first option 260 or first option 262, both bollard 220 and bollard 222 are lowered.

Augmented user interface 160 indicates the camera feed viewed by the operator in a text box, shown as feed indicator 280. In some alternative embodiments, augmented user interface 160 does not include feed indicator 280. According to various embodiments, augmented user interface 160 selectively toggles augmented information from being displayed on a camera feed. For example, augmented user interface 160 may toggle augmented information from being overlaid based on a trigger. The trigger may be related to an event or a command from the operator.

Based on the information received from the video management system and the security management system and/or the building management system, augmented user interface 160 determines several augmented factors. The augmented factors may include item location with respect to a target camera view (e.g., the camera indicated on feed indicator 280), location of a border (e.g., border 230, border 232), shape of a border (e.g., border 230, border 232), location of any text (e.g., label 250, label 252, first option 260, first option 262, expandable list 270, expandable list 272, etc.), a preferred color scheme (e.g., color of text, color of a border, etc.), font size (e.g., font size of any text), and transparency (e.g., transparency of a border, any text, etc.).

According to various embodiments, augmented user interface 160 is capable of displaying and/or hiding the augmented information (e.g., the information from the security management system and/or the information from the building management system) on demand. Further, a color of the augmented content (e.g., the color of first option 260, etc.) may be toggled (e.g., adjusted, altered, etc.) such that all available text is clearly visible (e.g., does not interfere with background colors) to the operator. In other applications, it is understood that selection pane 240 may include more or less text boxes. In an alternative embodiment, vehicle 210 is generally bordered by a border and includes a selection pane that further includes a number of text boxes.

Figure 3:
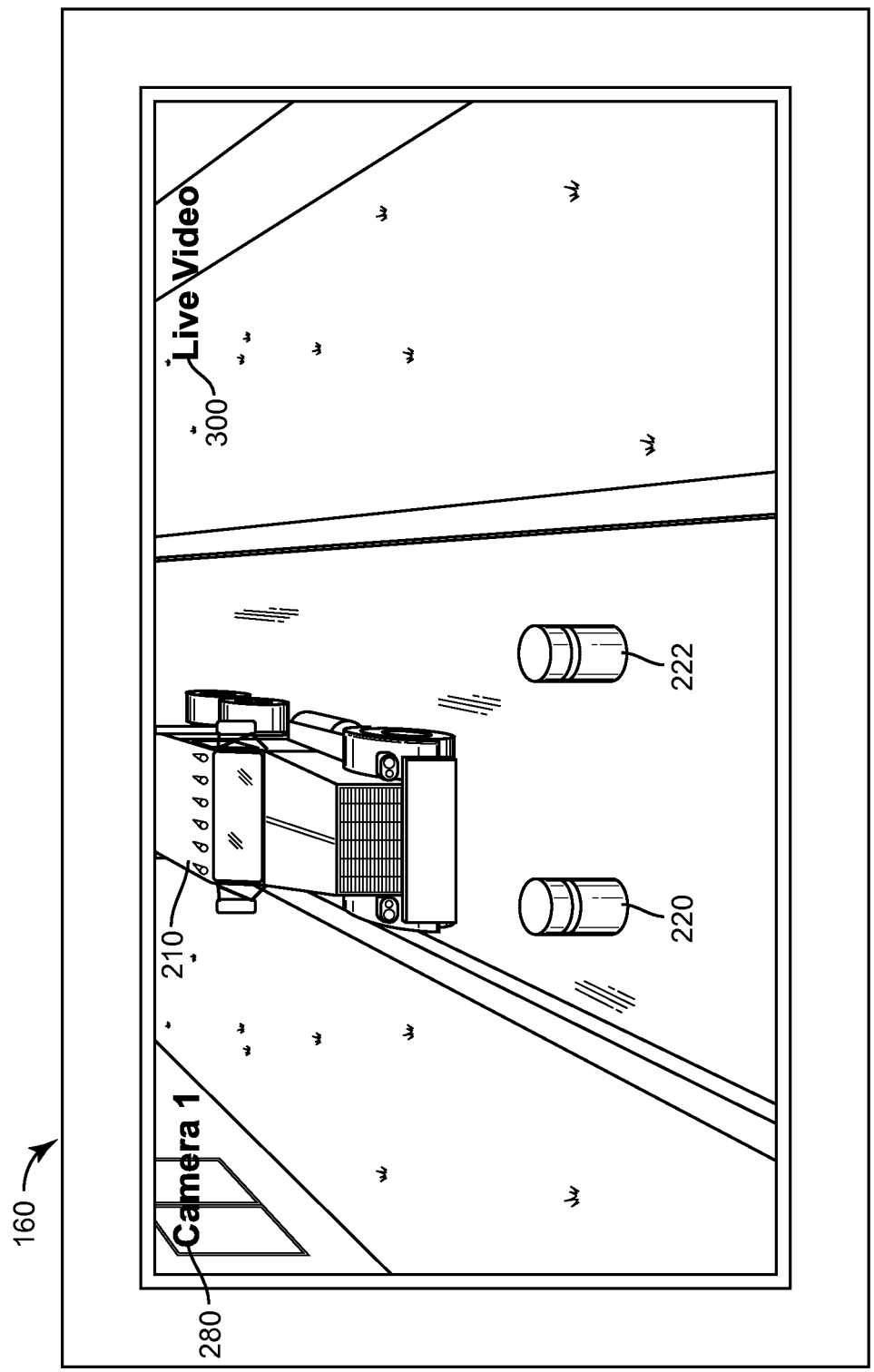
FIG. 3 is another view of the augmented user interface system shown in FIG. 2.

FIGS. 3-9 illustrate an exemplary operation of augmented user interface 160 through a series of images of augmented user interface 160. In FIGS. 3-9, an operator is interacting with augmented user interface 160 through augmented user interface system 100 via a touch screen tablet. Augmented user interface 160 may further include a text box, shown as feed status 300. Feed status 300 may be configured to indicate a status of the camera feed being displayed through augmented user interface 160 such as, for example, "Live Video," "Stored video," "Video From . . . ," and other similar status indicators. As shown in FIG. 3, vehicle 210 approaches bollard 220 and bollard 222, as can be seen in the video management system. According to some embodiments, augmented user interface 160 is configured to overlay augmented information in response to a trigger. For example, augmented user interface 160 may overlay augmented information in response to an alert from the security management system that vehicle 210 is approaching bollard 220 and/or bollard 222. In another example, the operator may manually trigger augmented user interface 160 to overlay augmented information.

Figure 4:
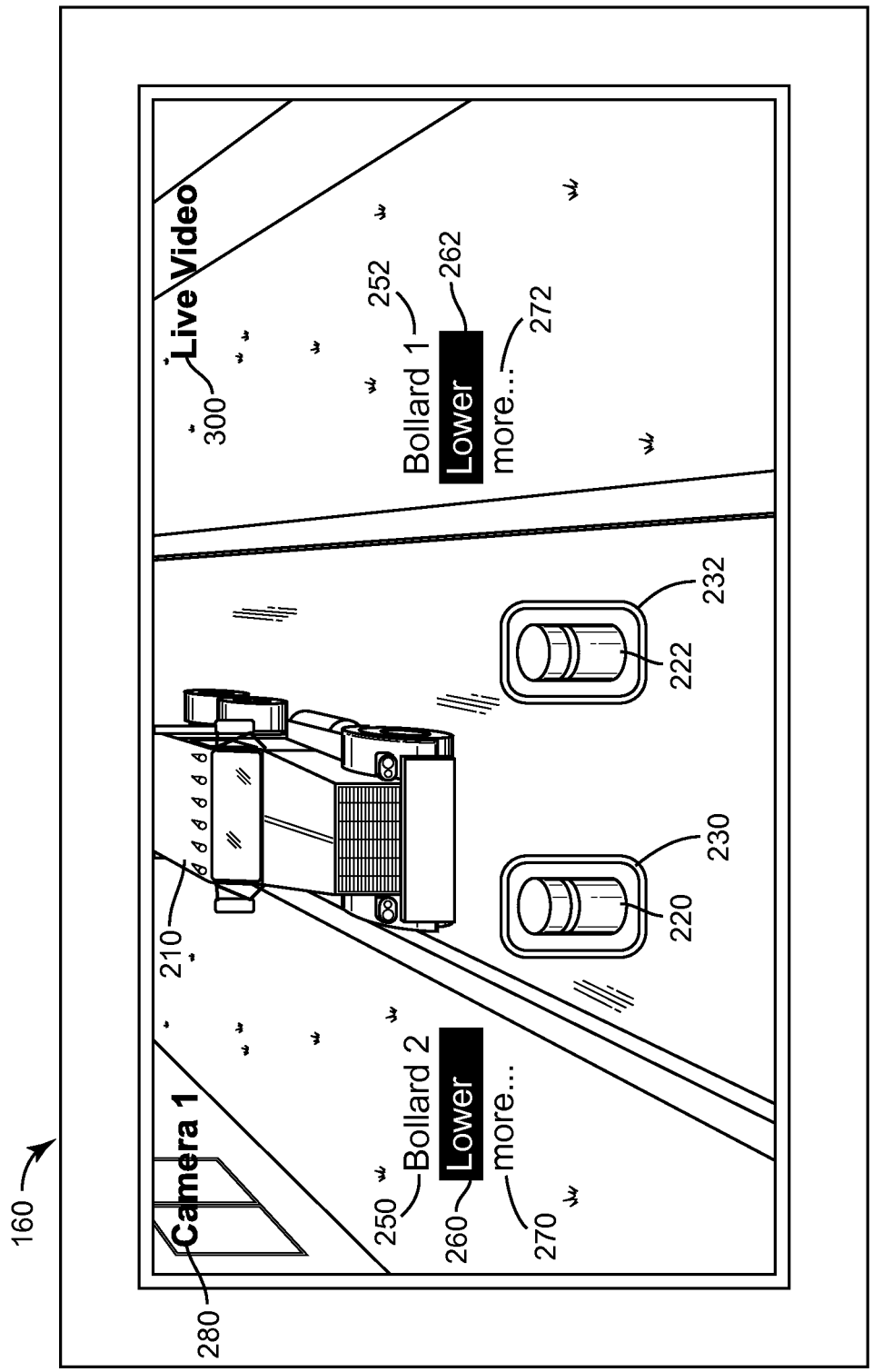
FIG. 4 is another view of the augmented user interface system shown in FIG. 2.
Figure 5:
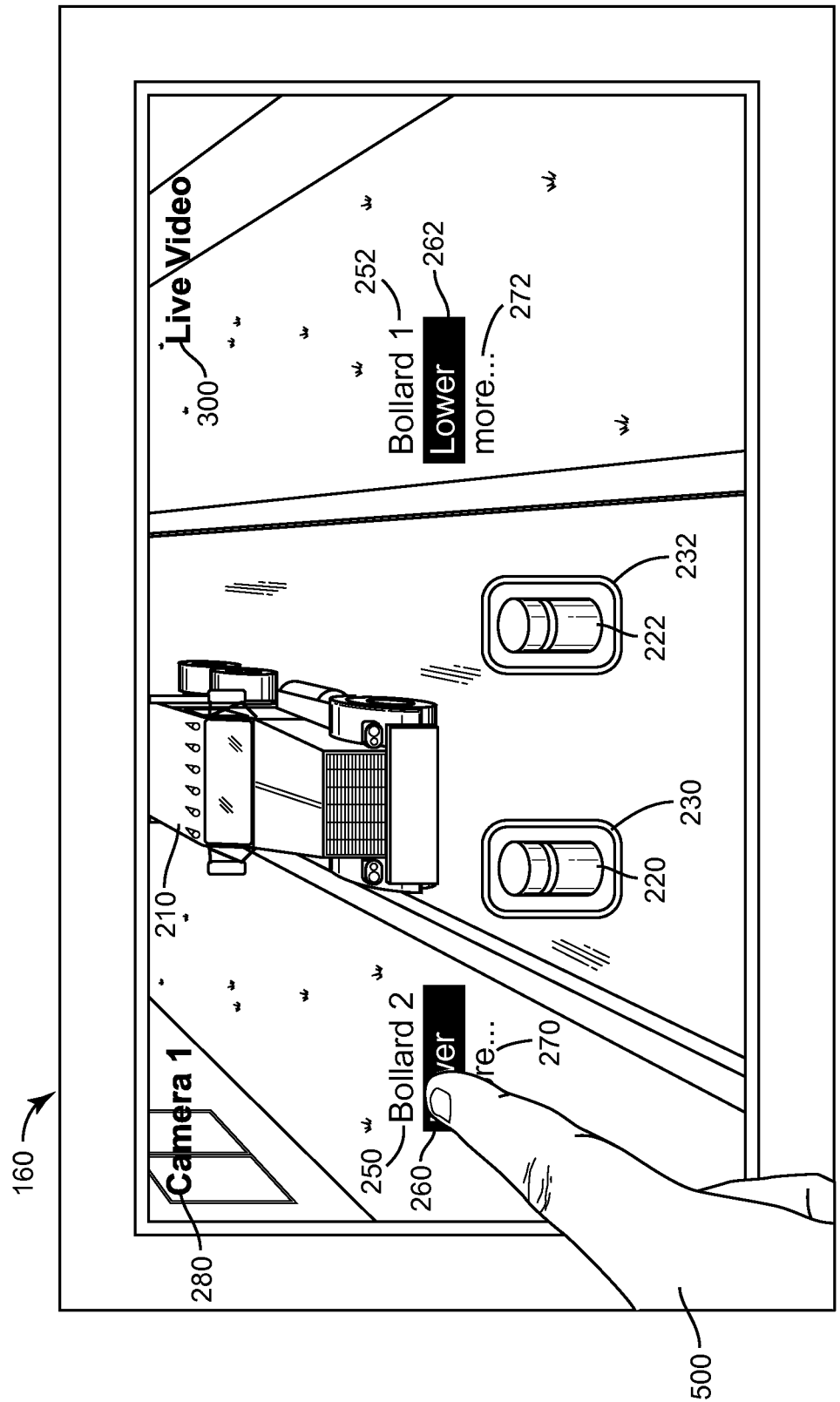
FIG. 5 is another view of the augmented user interface system shown in FIG. 2.

As shown in FIG. 4, augmented user interface 160 has been overlaid with augmented information and augmented user interface 160 displays all information necessary to address the present situation (i.e., vehicle 210 has approached bollard 220 and bollard 222). From augmented user interface 160, the operator may select first option 260 which, according to one embodiment, corresponds to a command to lower bollard 220. For example, as shown in FIG. 5, the operator may select first option 260 using an input device, shown as finger 500. Alternatively, the operator may make the selection using one of the other input devices previously outlined.

Figure 6:
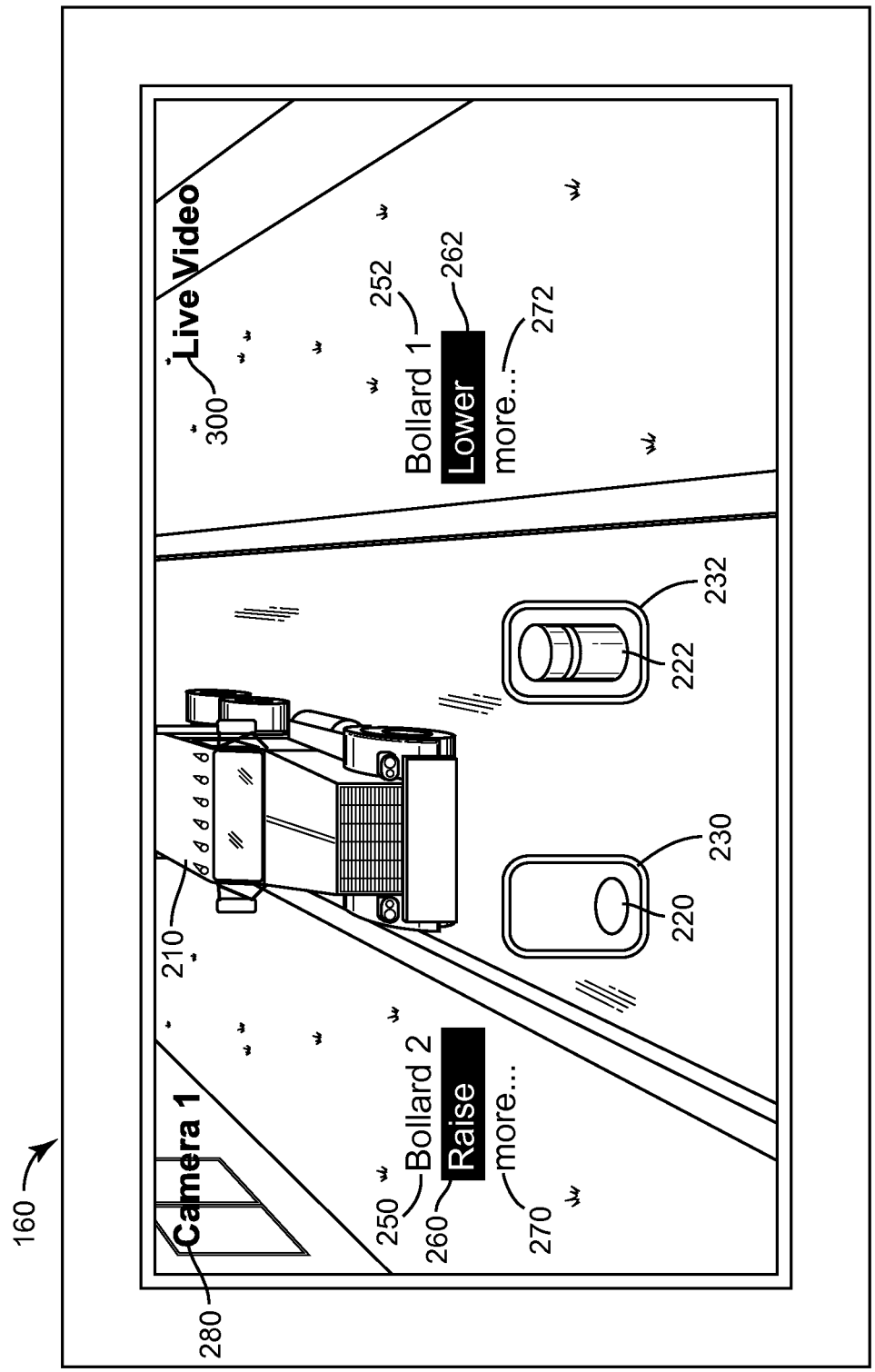
FIG. 6 is another view of the augmented user interface system shown in FIG. 2.
Figure 7:
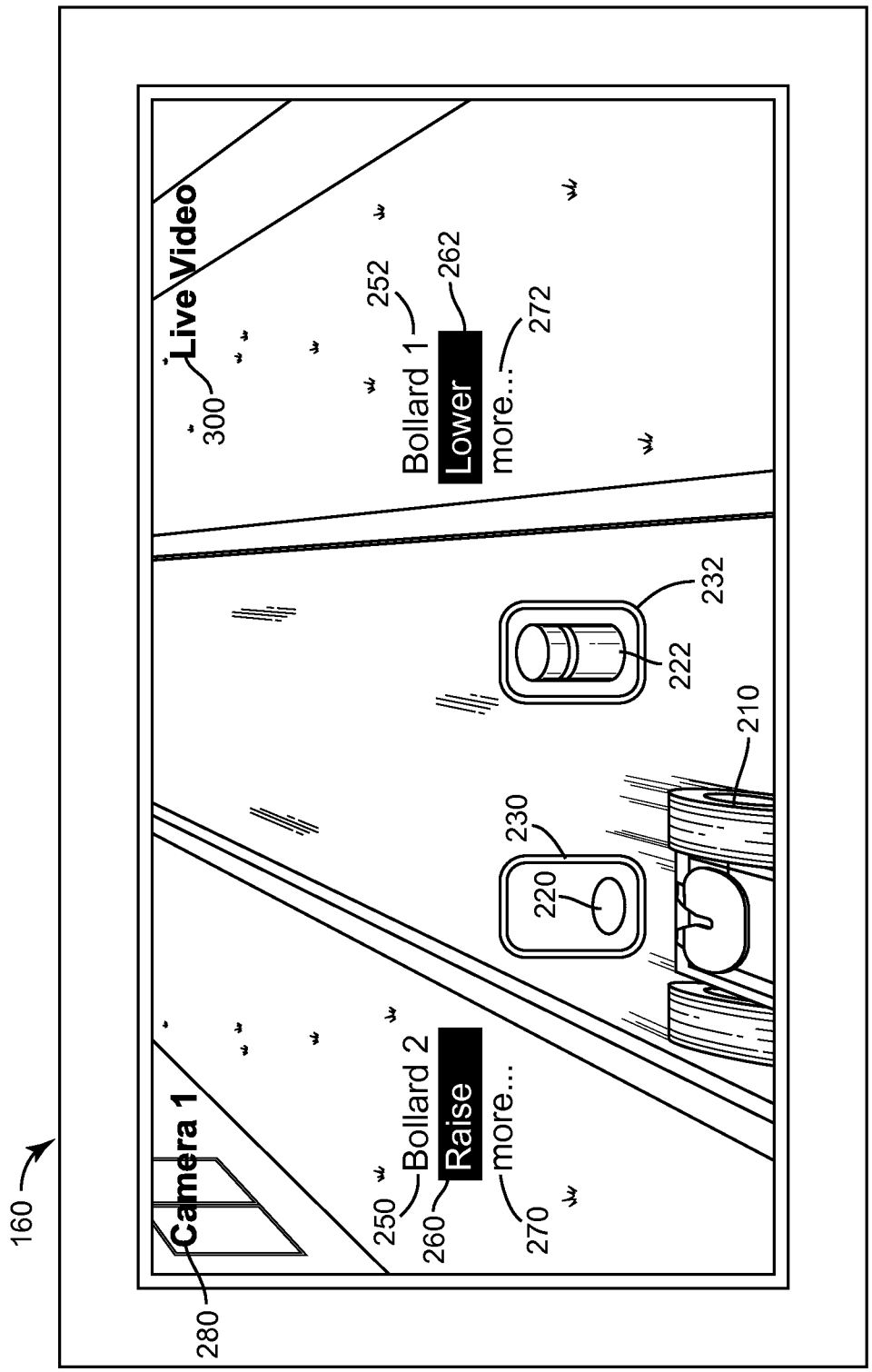
FIG. 7 is another view of the augmented user interface system shown in FIG. 2.
Figure 8:
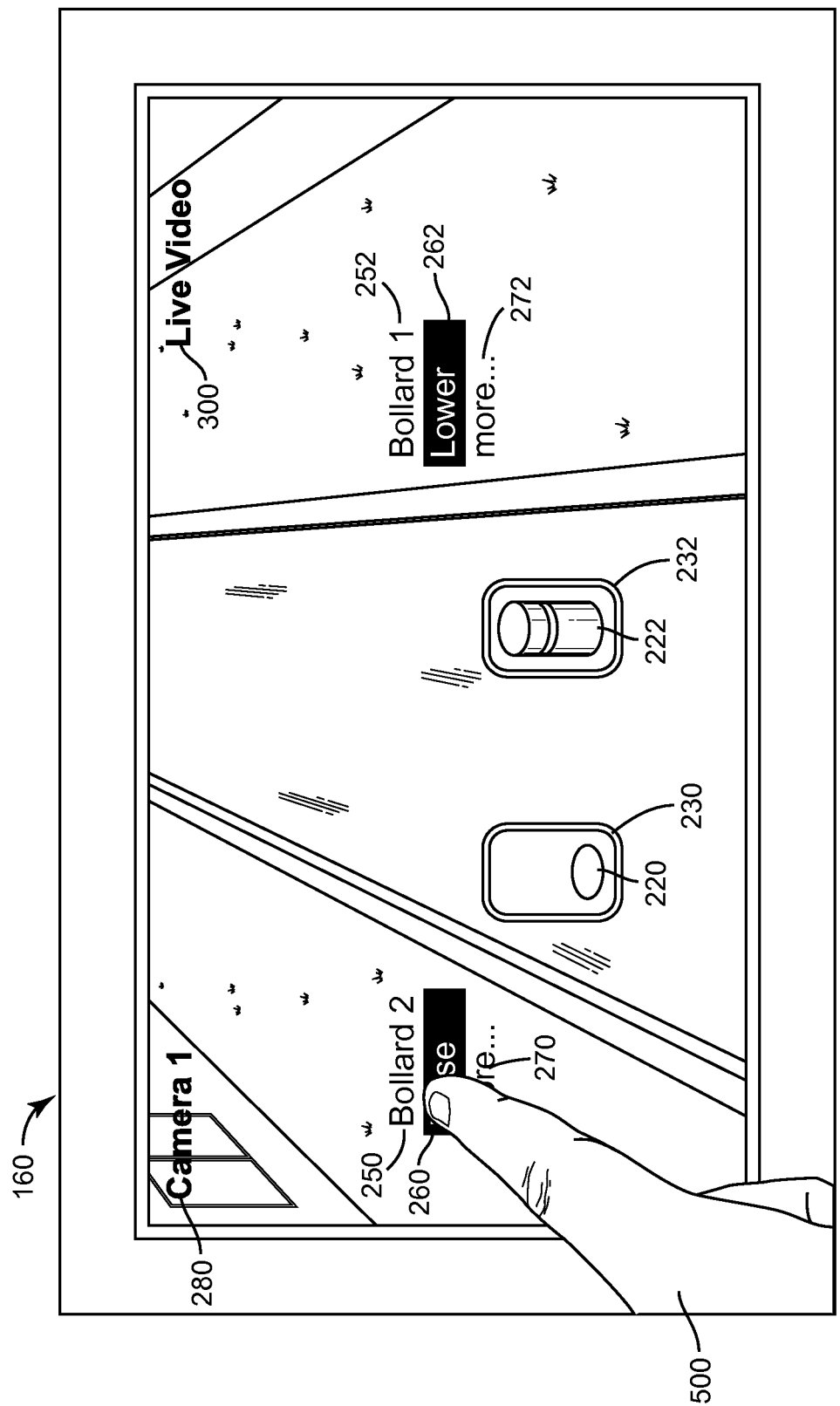
FIG. 8 is another view of the augmented user interface system shown in FIG. 2.
Figure 9:
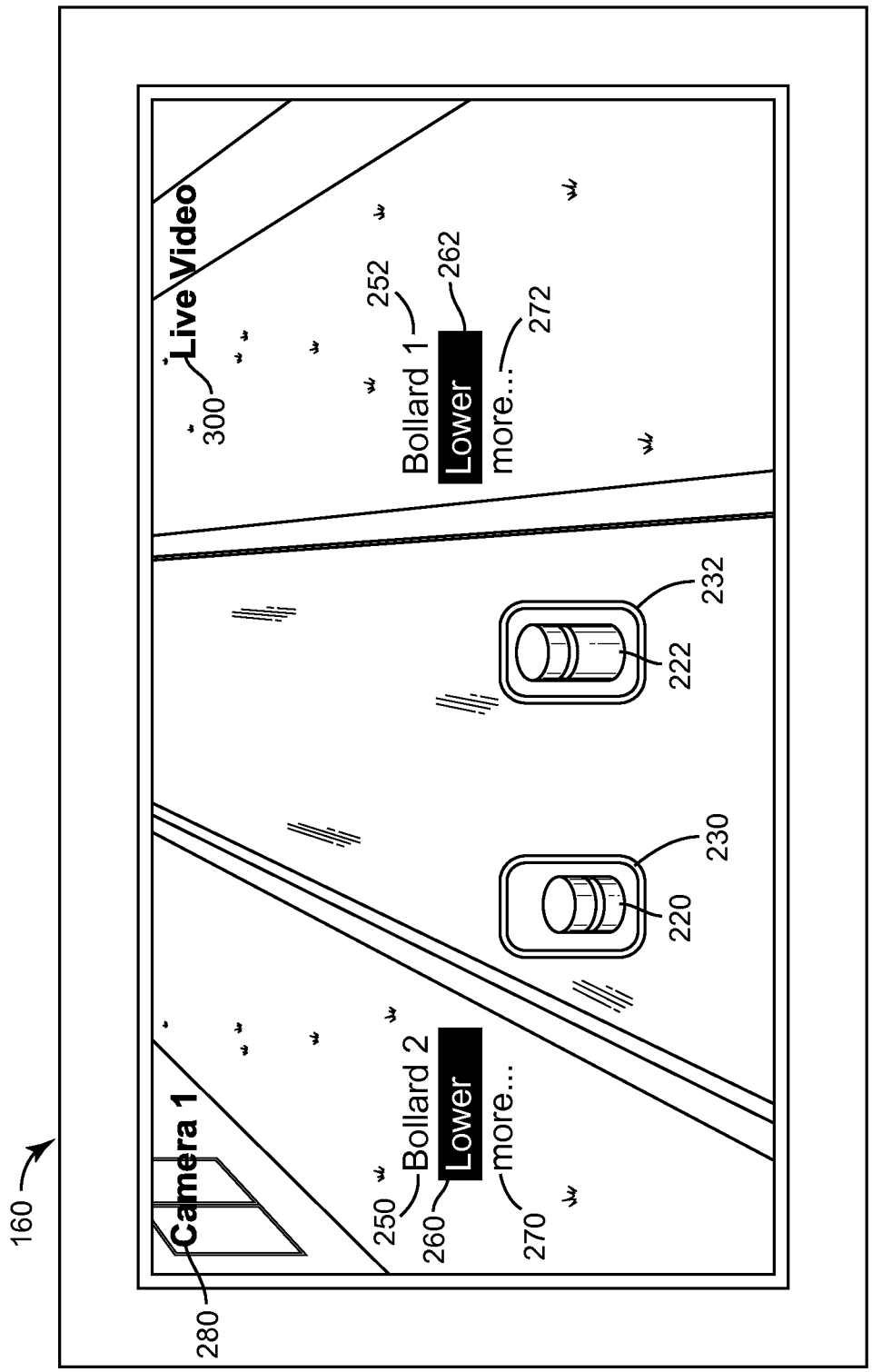
FIG. 9 is another view of the augmented user interface system shown in FIG. 2.

As shown in FIGS. 6-7, bollard 220 has been lowered and vehicle 210 is allowed to pass. Also shown in FIGS. 6-7, first option 260 now corresponds to a different command for bollard 220 because the state of bollard 220 has changed. In this way, first option 260, first option 262, and any text boxes contained within expandable list 270 and expandable list 272, may be based on a current state of bollard 220, bollard 222, or a similar object. For example, in FIGS. 6-7, bollard 220 is lowered and first option 260 now corresponds to a command to raise bollard 220. In FIG. 8, the operator selects first option 260 and raises bollard 220. First option 260, first option 262, and all other text boxes may correspond to a command to perform an entire action (e.g., complete raising or complete lowering of bollard 220, etc.), may correspond to a command to perform an incremental action (e.g., raising or lowering bollard 220 an incremental amount, etc.), or may correspond to a command to perform an action for an amount of time indicated by the operator (e.g., raising or lowering bollard 220 while the operator is selecting first option 260). As shown in FIG. 9, bollard 220 is being raised according to the command from the operator. The operator may observe the results of selecting first option 260 (e.g., the raising of bollard 220) via augmented user interface 160. At any time, the operator may manually remove any or all augmented information such that only the camera feed provided by the video management system is shown.

Figure 10:
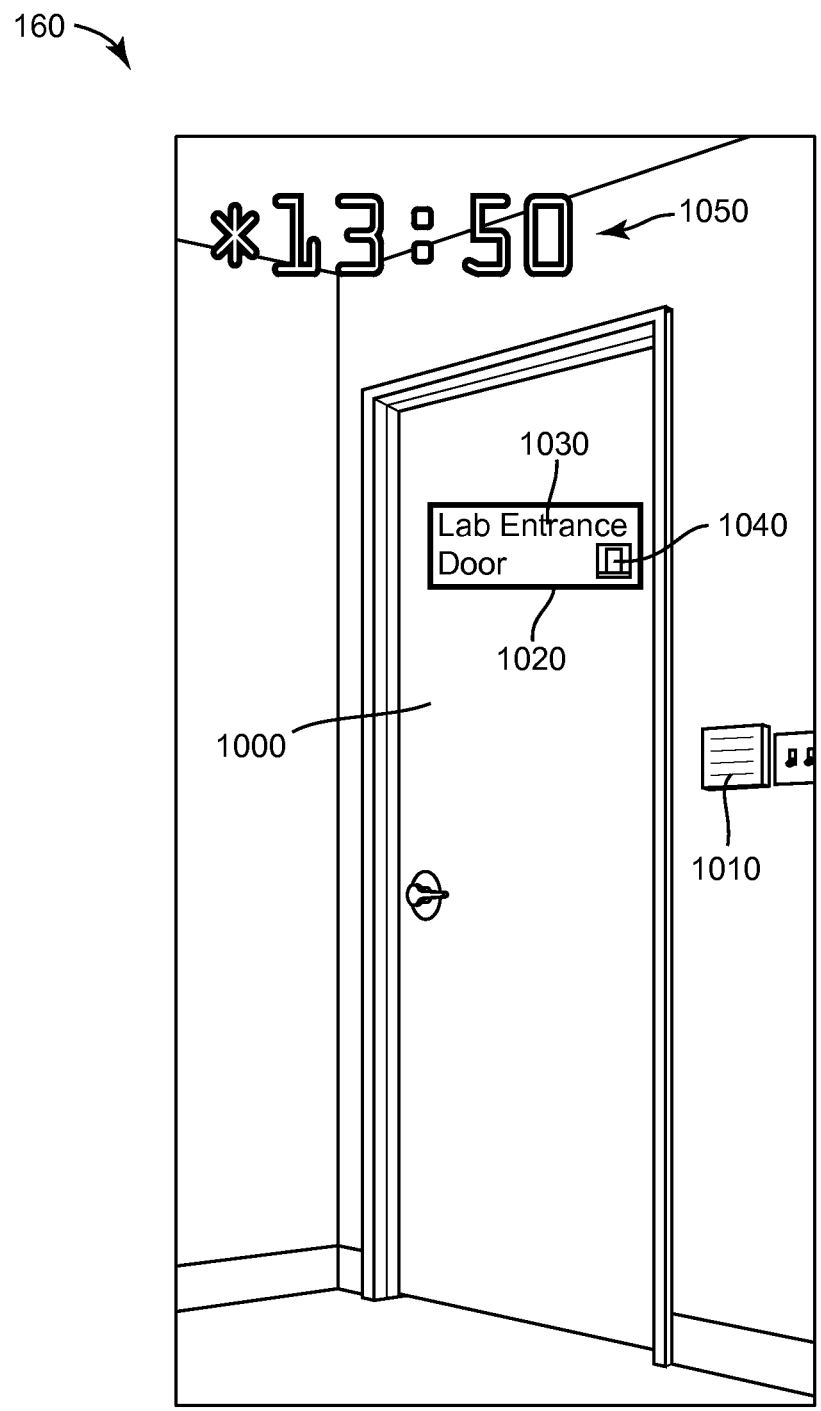
FIG. 10 is a view of another augmented user interface system, according to an exemplary embodiment.
Figure 11:
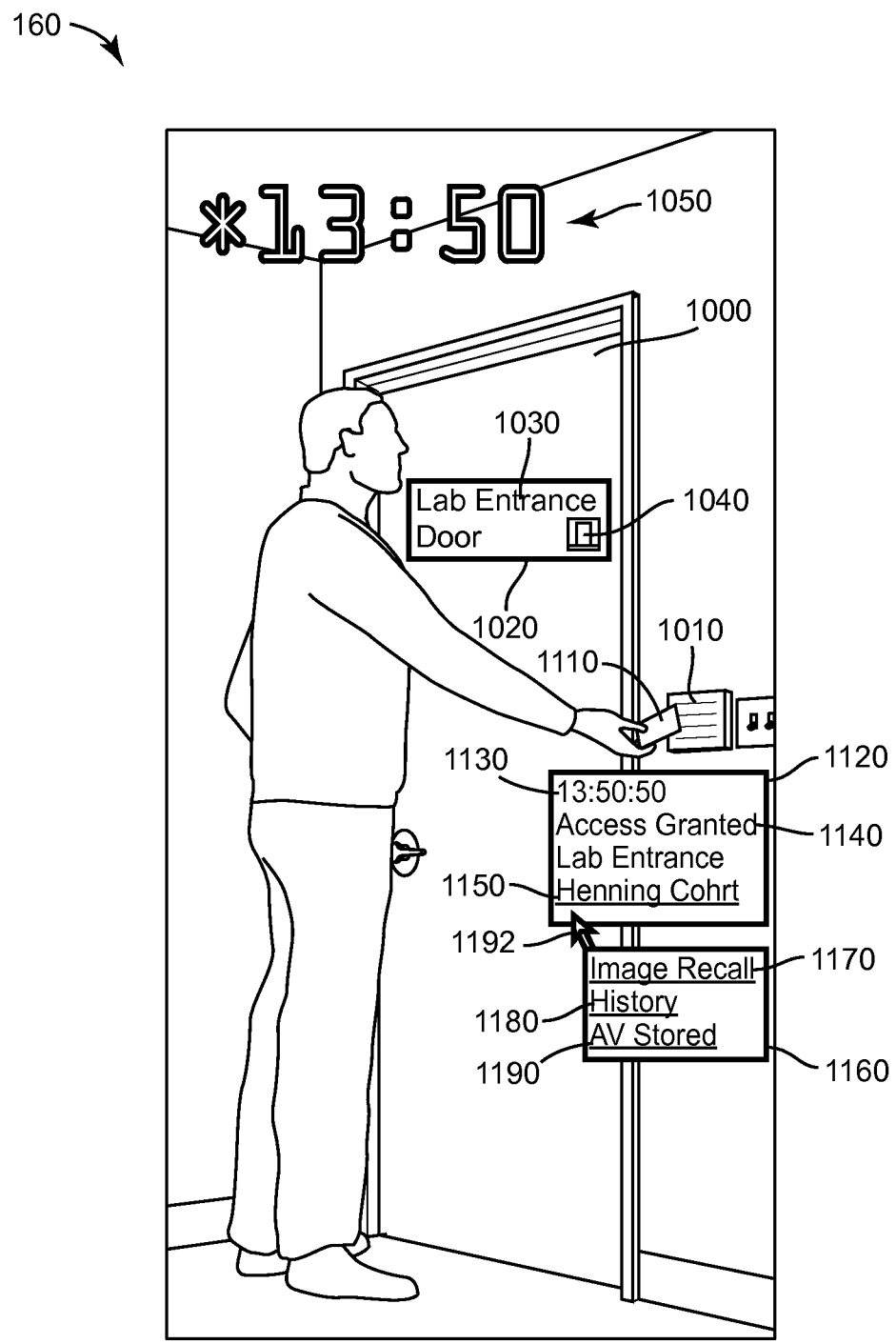
FIG. 11 is another view of the augmented user interface system shown in FIG. 10.
Figure 12:
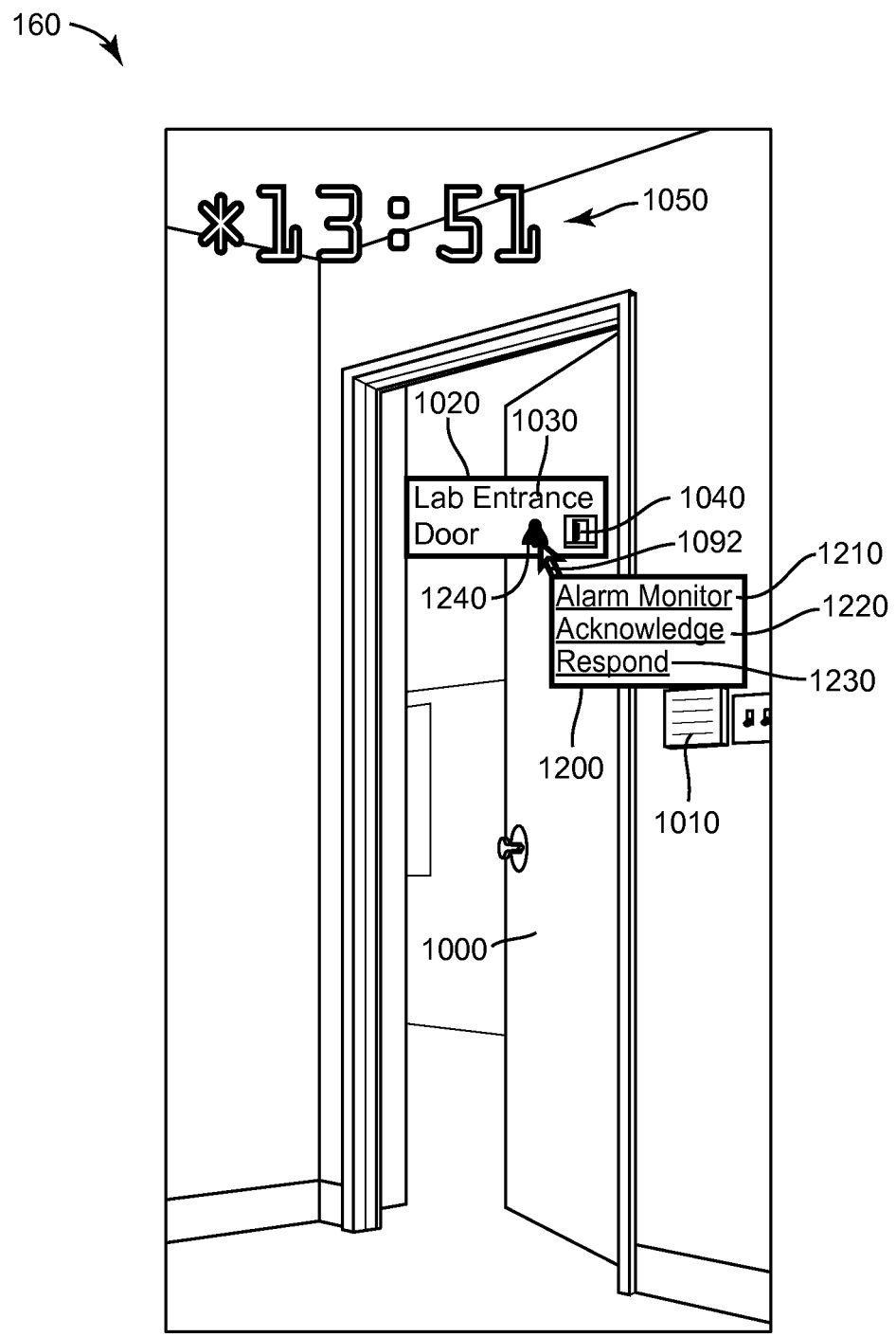
FIG. 12 is another view of the augmented user interface system shown in FIG. 10.

FIGS. 10-12 illustrate another exemplary operation of augmented user interface 160 through a series of images of augmented user interface 160. FIG. 10 shows a door, shown as door 1000. Mounted near door 1000 is a panel, shown as card reader 1010. According to various embodiments, card reader 1010 is configured to selectively unlock door 1000 in response to detecting an authorized card (e.g., identification badge, etc.) from a user. In FIG. 10, door 1000 is closed and locked. It is understood that rather than door 1000, another object, item, or component may be substituted. For example, augmented user interface 160 may recognize crash bars, glass break sensors, emergency buttons, bollards, gates, windows, ramps, and other suitable components of building management system 110 and security management system 130.

As shown in FIG. 10, augmented user interface 160 includes an object, shown as description object 1020. According to various embodiments, description object 1020 includes a description, shown as description 1030, and an indicator, shown as status indicator 1040. Description 1030 may be a description of door 1000 and include relevant information such as relative or exact location. Status indicator 1040 may be an icon (e.g., picture, graphic, etc.), a letter, or a number. According to various embodiments, status indicator 1040 is configured to convey to the operator a status (e.g., locked, unlocked, closed, open, secure, active, inactive, fault, over ride, lockdown, etc.) of door 1000. In FIG. 10, status indicator 1040 has a first value configured to convey to the operator that door 1000 is closed and/or locked. Description object 1020 may include multiple status indicators 1040. In some embodiments augmented user interface 160 further includes a text box, shown as time stamp 1050. Time stamp 1050 may illustrate the exact time corresponding to a particular instant in the camera feed viewed by augmented user interface 160. Time stamp 1050 may include an indicator that indicates if the camera feed is real time, or, conversely, if the camera feed is not real time (e.g., the camera feed is stored). Time stamp 1050 may include additional information such as a date, a detailed time layout (e.g., including seconds), and other temporal information.

As shown in FIG. 11, an individual, shown as individual 1100, is attempting to open door 1000 by presenting a card, shown as card 1110 to card reader 1010. In addition to description object 1020, card 1110 may trigger additional augmented information to be displayed to the operator on augmented user interface 160. In various embodiments, augmented user interface 160 further includes an object, shown as status object 1120, that includes a time stamp, shown as time stamp 1130, a first text box, shown as status box 1140, and a second text box, shown as individual identifier box 1150. Time stamp 1130 may display an exact time that card 1110 was read (e.g., decoded, scanned, imaged, etc.) by card reader 1010. Status box 1140 may include a written description of a determination by card reader 1010. Alternatively, status indicator 1040 may include an event history of door 1000. Individual identifier box 1040 may include a name, identification number, picture (e.g., badge picture), a short history of where the person was last identified), or other identification of individual 1100. The operator may select individual identifier box 1040 to display additional information related to individual 1100 such as a detailed location history.

According to various embodiments, augmented user interface 160 further includes another object, shown as interactive object 1060. Interactive object 1060 may present the operator with access to additional data to be displayed on augmented user interface 160. In some embodiments, interactive object 1060 includes a first text box, shown as image recall object 1170, a second text box, shown as access history object 1180, and a third text box, shown as stored files object 1190. Image recall object 1170 may allow the operator to display a previous image on augmented user interface 160. Access history object 1180 may allow the operator to visualize a listing of previous activity of individual 1100 and door 1000. Stored files object 1190 may allow the operator to display previously stored audio or video files on augmented user interface 160. In one embodiment, stored files object 1190 allows the operator to display previously stored audio or video corresponding to individual 1100. Additionally, FIG. 11 shows a cursor, shown as cursor 1192. The operator may manipulate cursor 1192 (e.g., using a mouse) to interact with various objects (e.g., text boxes) within augmented user interface 160.

As shown in FIG. 12, individual 1100 has opened door 1000. According to an exemplary embodiment, individual 1100 has forcibly opened door 1000 after not being granted access by card reader 1010. Such an event may trigger an alarm to be visualized in augmented user interface 160. As shown in FIG. 12, an object, shown as alert object 1200 may be displayed on augmented user interface 160. Alert object 1200 may include a first textbox, shown as monitoring text box 1210, a second text box, shown as acknowledgement text box 1220, and a third text box, shown as responding text box 1230. Selecting monitoring text box 1210 may allow the operator to visualize additional information relating to the situation, including information related to door 1000 and individual 1100. Acknowledgment text box 1220 may allow the operator to silence (e.g., quiet, end, hide, etc.). Selecting responding text box 1230 may present the operator with options for responding to the alarm such as generating an audible alarm, initiating a lock down procedure, generating an announcement over an audio system of the building, activating an annunciator or buzzer, alerting authorities, unlocking the door, over riding the door, and other suitable responses. As shown in FIG. 12, description object 1020 may further include an object, shown as alert graphic 1240. Alert graphic 1240 may be present if an alert is generated. As shown in FIG. 12, status indicator 1040 has changed to indicate the presence of an alert.

Figure 13:
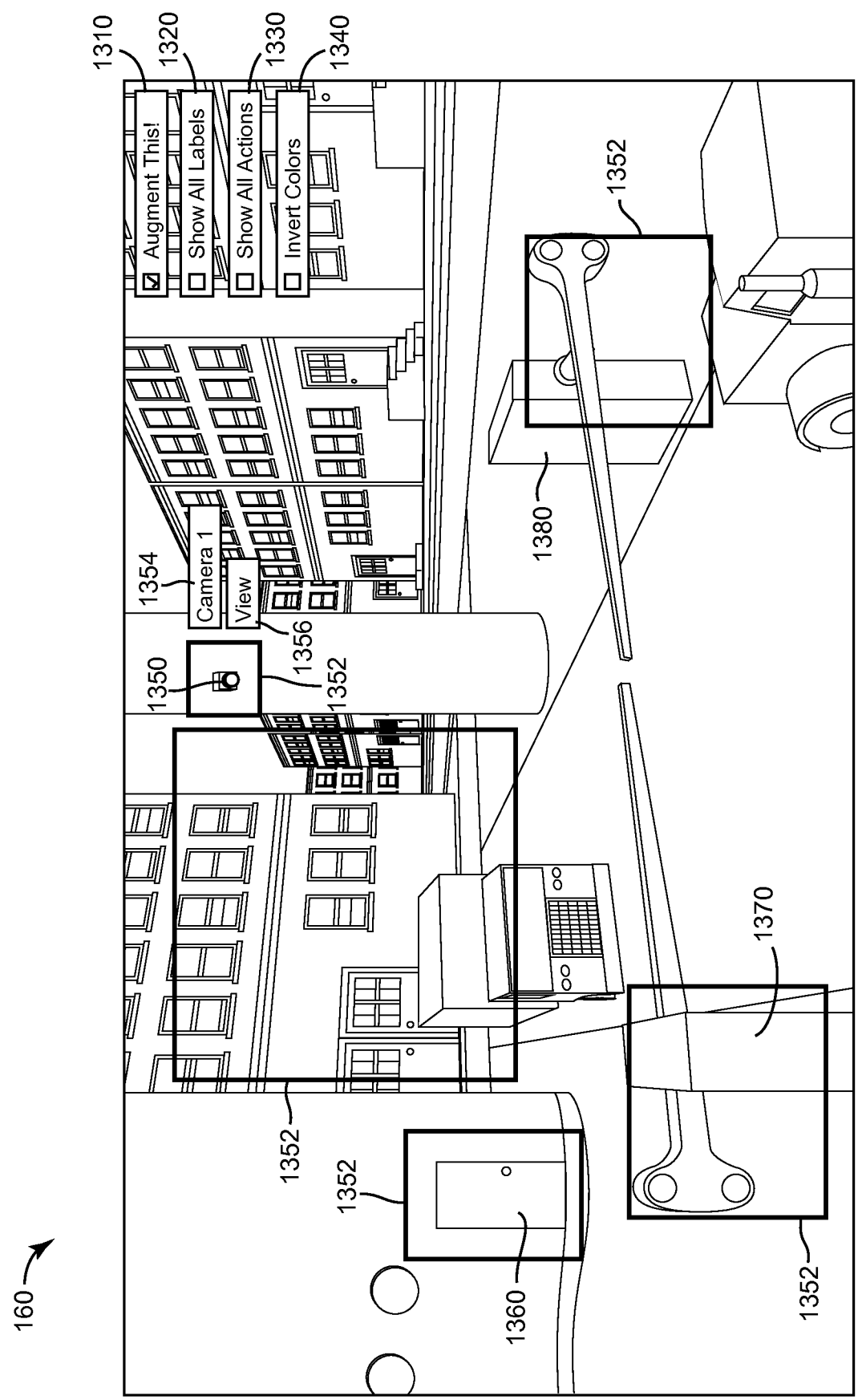
FIG. 13 is a view of yet another augmented user interface system, according to an exemplary embodiment.
Figure 14:
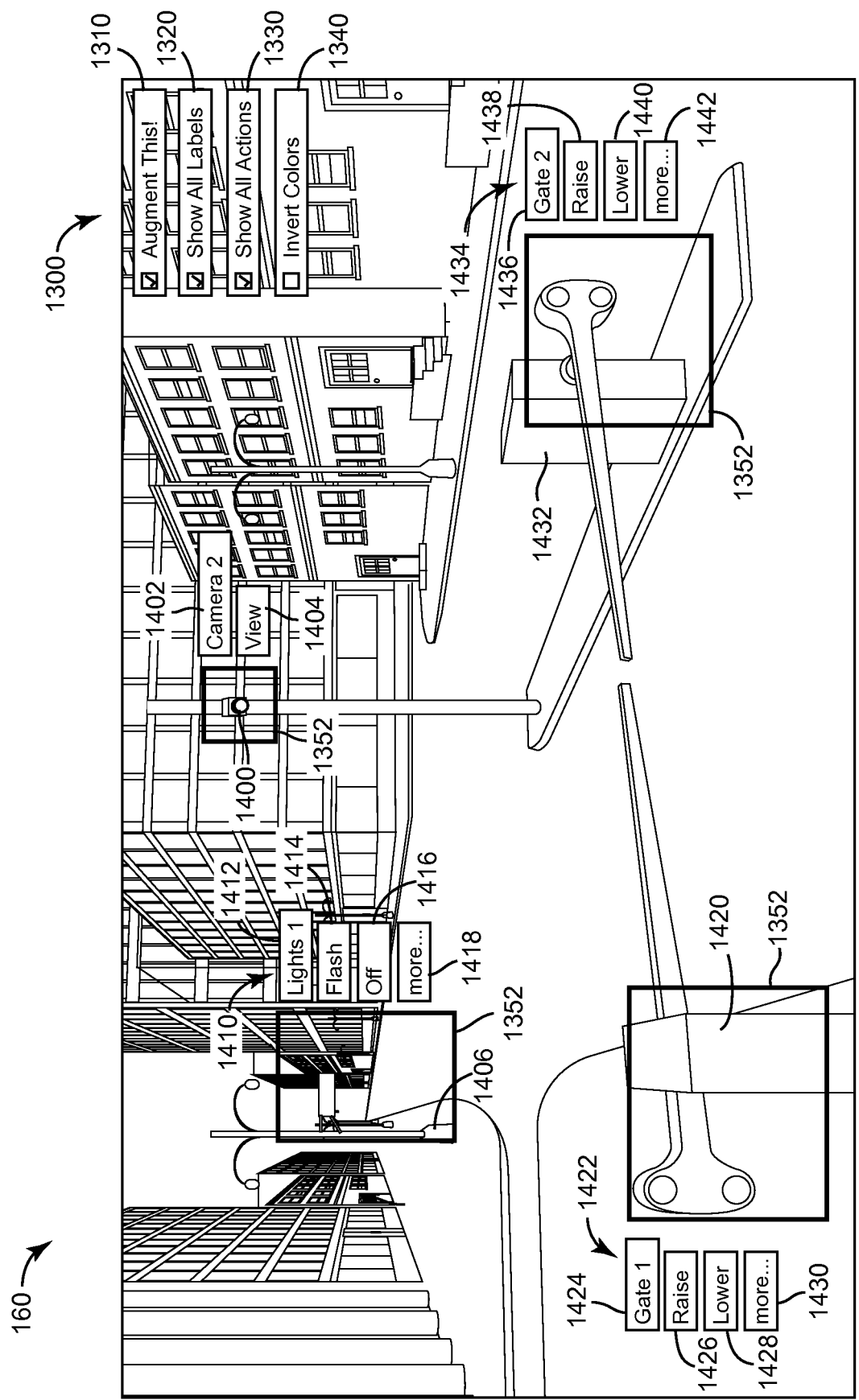
FIG. 14 is another view of the augmented user interface system shown in FIG. 13.

FIGS. 13 and 14 illustrate yet another exemplary operation of augmented user interface 160 through a series of images of augmented user interface 160. In some embodiments, augmented user interface 160 includes a menu, shown as overlay menu 1300. Overlay menu 1300 may allow the operator to selectively display various information on augmented user interface 160. According to an exemplary embodiment, overlay menu 1300 includes a first option, shown as option 1310, a second option, shown as option 1320, a third option, shown as option 1330, and a fourth option, shown as option 1340. Option 1310, option 1320, option 1330, and option 1340 may include a text description and a selection indicator. The text description may correspond to the information to be overlaid on augmented user interface 160. The selection indicator may be operable between a selected state, indicating that correspondingly, option 1310, option 1320, option 1330, and/or option 1340 has been selected, and an unselected state indicating that correspondingly, option 1310, option 1320, option 1330, and/or option 1340 has not been selected. As shown in FIG. 13, only option 1310 is selected. In one embodiment, option 1310 corresponds to a command to overlay augmented information and identify components within augmented user interface 160. According to one embodiment, selection of option 1310 allows augmented user interface 160 to recognize a camera, shown as camera 1350. In one exemplary embodiment, option 1320 corresponds to a command to overlay labels for all recognized components in augmented user interface 160, option 1330 corresponds to a command to display all actions for all recognized components in augmented user interface 160, and option 1340 corresponds to a command to invert a color scheme of augmented user interface 160.

According to various embodiments, camera 1350, and all other components recognized by augmented user interface 160 are generally bordered in a border, shown as component border 1352. Component borders 1352 may have a shape and size corresponding to a shape and size of the corresponding component. For some applications, component borders 1352 may be rectangular. However, in other applications component borders 1352 may have a circular, triangular, polygonal, or free-form shape. Further, in some applications, component borders 1352 may be defined or redefined by the operator. In one application, the operator may draw component borders 1352 around components through augmented user interface 160. In this manner, component borders 1352 may best match contours of components in augmented user interface 160. In some embodiments, component borders 1352 are color coded corresponding to a classification or type of component. In other embodiments, component borders 1352 are configured to flash or be of different line weights, colors, or styles based on a status, history, and/or alert of the component. In one embodiment, a color of component border 1352 is altered based on a surrounding color as seen in augmented user interface 160. For example, a component border 1352 is typically black. However, in one application, component border 1352 must generally bordered a black truck. Following this application, component border 1352 may surround the black truck and may change color to a color that is dissimilar with a background color (e.g., red, etc.).

In one embodiment, a first text box, shown as description 1354, indicates to the operator the component name of camera 1350. In some applications it may be desirable to change the field of view (e.g., vantage point, etc.) of the operator. In these applications, the operator may select an option, shown as viewing option 1356. Selecting viewing option 1356 may allow the operator to change the field of view of augmented user interface 160 to that of camera 1350. For example, camera 1350 may provide a different viewing angle or zoom factor than currently observed in augmented user interface 160. Further, camera 1350 may provide an illumination of various components or areas in combination with a spot light. Other components recognized by augmented user interface 160 may include a door, shown as door 1360, a first gate, shown as gate 1370, and a second gate, shown as gate 1380. According to various embodiments, door 1360, gate 1370, and gate 1380 may be generally bordered in component border 1352.

As shown in FIG. 14, option 1310, option 1320, and option 1330 are selected. According to various embodiments, augmented user interface 160 recognizes a camera, shown as camera 1400. In one embodiment, a first text box, shown as description 1402, indicates to the operator the component name of camera 1400. Similar to viewing option 1356, an option, shown as viewing option 1404, may correspond to camera 1400. Selecting viewing option 1404 may allow the operator to change the field of view of augmented user interface 160 to that of camera 1400.

Further, FIG. 14 illustrates component border 1352 generally bordering an object, shown as light 1406, a second option, shown as gate 1420, and a third object, shown as gate 1432. According to various embodiments, proximate component border 1352 generally bordering light 1406 is a list, shown as option list 1410. Option list 1410 may contain a text box, shown as description 1412, a first option, shown as option 1414, a second option, shown as option 1416, and a third option, shown as option 1418. According to various embodiments, each of option 1414, option 1416, and option 1418 correspond to different commands for light 1406. For example, selection of option 1416 by the operator may correspond to a command to turn off light 1406. Description 1412 may indicate a component name for light 1406. Selection of option 1418 may correspond to augmented user interface 160 displaying additional command options for light 1406.

According to various embodiments, proximate component border 1352 and generally bordering gate 1420 is a list, shown as option list 1422. Option list 1422 may contain a text box, shown as description 1424, a first option, shown as option 1426, a second option, shown as option 1428, and a third option, shown as option 1430. According to various embodiments, each of option 1426, option 1428, and option 1430 correspond to different commands for gate 1420. For example, in one embodiment, selection of option 1426 by the operator may correspond to a command to raise gate 1420. Description 1424 may indicate a component name for gate 1420. Selection of option 1430 may correspond to augmented user interface 160 displaying additional command options for gate 1420.

According to various embodiments, proximate component border 1352 and generally bordering gate 1432 is a list, shown as option list 1434. Option list 1434 may contain a text box, shown as description 1436, a first option, shown as option 1438, a second option, shown as option 1440, and a third option, shown as option 1442. According to various embodiments, each of option 1438, option 1440, and option 1442 correspond to different commands for gate 1432. For example, in one embodiment, selection of option 1440 may correspond to a command to lower gate 1432. Description 1436 may indicate a component name for gate 1432. Selection of option 1442 may correspond to augmented user interface 160 displaying additional command options for gate 1432.

Augmented user interface 160 may be operated through augmented user interface system 100 via a device such as a computer, laptop, tablet, phone, smart phone, television, monitor, wearable computer, and other suitable devices. According to various embodiments, augmented user interface 160 is operated on a device having a processing circuit that includes a processor and memory.

To generate augmented content, the operator may associate components of building management system 110 and/or security management system 130 with components shown in augmented user interface 160. Once these associations have been entered by the operator, they may be saved in processing circuit of the device (e.g., in the memory). These associations may be accessed in various camera feeds (e.g., from various cameras and various vantage points) such that the operator need to make an association for a target component one time. For example, the operator may be provided with a list of components and required to associate the component in augmented user interface 160 with one component from the list of components. The list of components may be sorted and may be generated based on data from building management system 110 and/or security management system 130.

In some embodiments, augmented user interface 160 is capable of assisting in configuring augmented content by using geospatial information of components, as determined by augmented user interface 160, and comparing that geospatial information to stored geospatial information of components of building management system 110 and/or security management system 130. For example, when making associations for a particular room, augmented user interface system 100 may provide a list of components located only within that room.

Similarly, in some embodiments, augmented user interface 160 may recognize components based on past associations or actions by the operator. For example, if the operator has made a number of associations of doors between data from building management system 110 and/or security management system 130 and augmented user interface 160, augmented user interface 160 may recognize other doors that have not yet been associated by the operator.

The operator may select a text box, object, text, or graphic to retrieve camera feeds related to the selected text box, object, text, or graphic. For example, the operator may utilize augmented user interface 160 to view all camera feeds from when a door was forcibly entered. In another example, the operator may utilize augmented user interface 160 to view all camera feeds in which a certain person (e.g., individual 1100) was identified in the last twenty-four hours.

In addition to building management system 110, video management system 120, and security management system 130, augmented user interface 160 may also incorporate information from intrusion detection systems and building automation systems. Information from intrusion detection systems and building automation systems may include an indication of whether a target area is armed or disarmed, an indication of whether a target area is occupied or unoccupied, temperature values, temperature set points, and other information related to the intrusion detection systems and building automation systems.

Augmented user interface 160 may be operable for camera feeds from fixed cameras and from PTZ cameras. Further, augmented user interface 160 may be operable for a PTZ camera while the PTZ camera is panning, tilting, or zooming. In some embodiments, controls (e.g., play, pause, record, fast-forward, rewind, stop, etc.) for a camera feed displayed by augmented user interface 160 may be positioned on augmented user interface 160. For example, the operator may have the ability to control the camera feed (e.g., from video management system 120) or augmented user interface 160 while within augmented user interface 160. Similarly, in some embodiments, controls for building management system 110 and/or security management system 130 may be positioned on augmented user interface 160. For example, the operator may have the ability to turn on or off a spotlight while within augmented user interface 160.

According to various embodiments, the operator may select a text box, object, text, or graphic to obtain more information about the text box, object, text, or graphic. The operator may use an alternate selection method (e.g., right-click, etc.) on a text box, object, text, or graphic to obtain a menu of commands for the text box, object, text, or graphic. The menu of commands may be tailored according to privileges of the operator.

In some applications, augmented user interface 160 may allow the operator to take a virtual tour of a building. For example, by switching between various camera feeds (e.g., from video management system 120), augmented user interface 160 may display various images from within a building to the operator.

Depending on the configuration of augmented user interface 160, it is understood that various text boxes and objects may be selectable by the user. Similarly, various text boxes, objects, text, and graphics may be altered based on the camera feed displayed on augmented user interface 160. For example, augmented user interface 160 may be configured to alter the color of text boxes, objects, text, and graphics based on an adjacent color (e.g., background) in the camera feed.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system, comprising:
   a first component;
   a camera that collects a camera feed containing at least a portion of the first component; and
   a user interface system configured to:

receive the camera feed;
analyze the camera feed to detect the first component;
display, after detection of the first component, the camera feed;
store the camera feed, thereby forming stored video associated with the first component;
generate an augmented user interface by overlaying onto the camera feed a first selectable option associated with a first command to be performed on the first component; and
perform the first command on the first component in response to a user selecting the first selectable option via the augmented user interface;
wherein the camera feed is analyzed prior to being displayed.

2. The building management system of claim 1,
wherein the user interface system is configured to query a security management system for commands associated with the first component; and
wherein the user interface system receives the first command in response to querying the security management system for commands.

3. The building management system of claim 1, wherein the user interface system is configured to transmit the augmented user interface to a mobile device associated with a user.

4. The building management system of claim 2, wherein the user interface system determines a name of the first component; and
wherein the user interface system provides the name of the first component to the augmented user interface to be displayed by the augmented user interface.

5. The building management system of claim 1, further comprising an alert module;
wherein the alert module is configured to receive an alert related to the first component;
wherein the alert module generates an alert graphic that is displayed on the augmented user interface; and
wherein selecting the alert graphic causes the alert to be silenced and causes the alert graphic to be changed.

6. The building management system of claim 5, further comprising a status module;
wherein the status module is configured to receive a status related to the first component and different from the alert;
wherein the status module generates a status icon, different from the alert graphic, that is displayed on the augmented user interface separately from the alert graphic; and
wherein selecting the status icon causes additional information about the first component to be displayed on the augmented user interface.

7. The building management system of claim 1,
wherein the augmented user interface is configured to display a second option associated with the first component; and
wherein selecting the second option causes the stored video to be displayed on the augmented user interface.

8. The building management system of claim 1, wherein the user interface system is configured to determine if at least one of a vehicle and a second user is present in the camera feed and to overlay a second option associated with at least one of the vehicle and the second user onto the camera feed.

9. A method for providing a building management system to an operator, the method comprising:
receiving a first camera feed from a first camera of a video management system;
displaying the first camera feed;
detecting a first component in the first camera feed;
requesting, in response to detecting the first component in the first camera feed, information about the first component from the building management system;
receiving, in response to requesting the information about the first component from the building management system, the information about the first component from the building management system;
overlaying, in response to receiving the information about the first component, the information about the first component on the first camera feed, forming an augmented user interface;
receiving a second camera feed from a second camera of the video management system;
detecting a second component in the second camera feed while the first camera feed is displayed; and
displaying, in response to a command from the operator, the second camera feed instead of the first camera feed;
wherein the second camera feed is analyzed prior to being displayed.

10. The method of claim 9, further comprising: requesting, in response to detecting the first component in the first camera feed, a first command associated with the first component from a security management system; and
receiving, in response to requesting the first command associated with the first component from the security management system, the first command associated with the first component from the security management system.

11. The method of claim 10, further comprising overlaying, in response to receiving the first command associated with the first component, the first command on the augmented user interface.

12. The method of claim 11, further comprising: selecting the first command on the augmented user interface in response to a first input from an operator, the first command resulting in a change to the first component; and
updating the augmented user interface according to the change to the first component.

13. The method of claim 10, further comprising analyzing, by at least one of the building management system and the security management system, the first component to determine a name of the first component; and
overlaying the name of the first component on the augmented user interface.

14. The method of claim 10, further comprising providing, by the security management system, an alert to the augmented user interface, the alert related to the first component; and
displaying, by the augmented user interface, an alert graphic related to the alert.

15. The method of claim 14, further comprising providing, by the security management system, a status to the augmented user interface, the status related to the first component and different from the alert; and
displaying, by the augmented user interface, a status icon related to the status, the status icon different from the alert graphic.

16. The method of claim 14, further comprising: displaying, by the augmented user interface, a selectable option on the augmented user interface; and
causing, in response to selection by a user of the selectable option, stored video of the first component to be displayed on the augmented user interface.

17. A user interface system, comprising:
- a video management system that simultaneously receives a camera feed from each of a plurality of cameras positioned within a building, thereby receiving a plurality of camera feeds;
- a building management system that includes a plurality of components associated within the building;
- a security management system that stores a plurality of commands associated with at least one of the plurality of components;
- a processing circuit that receives one of the plurality of camera feeds from the video management system, analyzes each of the plurality of camera feeds to detect each of the plurality of components, and that is communicable with the building management system and the security management system; and
- a display device that receives an augmented user interface from the processing circuit, the augmented user interface providing a list of the plurality of components, receiving a selected component from the list of the plurality of components, causing the processing circuit to receive the one of the plurality of camera feeds based on the selected component, and being created by overlaying the one of the plurality of camera feeds with at least one of i) information related to at least one of the components; and ii) at least one of the commands;
- wherein each of the plurality of camera feeds is analyzed prior to the display device receiving the augmented user interface.

18. The user interface system of claim 17, wherein the display device is configured to receive an input from a user, the input causing one of the plurality of commands to be performed to one of the plurality of components.

19. The user interface system of claim 17, wherein at least one of the building management system and the security management system is configured to analyze the one of the plurality of camera feeds to determine which of the plurality of components are shown in the one of the plurality of camera feeds.

20. The user interface system of claim 17, wherein the processing circuit comprises an alert module;
- wherein the alert module is configured to receive an alert from the security management system, the alert related to one of the plurality of components;
- wherein the alert module generates an alert graphic that is displayed on the augmented user interface; and
- wherein selecting the alert graphic causes the alert to be silenced and causes the alert graphic to be changed.

* * * * *